(12) United States Patent
Silver

(10) Patent No.: US 6,908,380 B2
(45) Date of Patent: Jun. 21, 2005

(54) HINGED UNLOADING AUGER FOR AN AGRICULTURAL COMBINE

(75) Inventor: Dennis P. Silver, Geneseo, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/055,582

(22) Filed: Jan. 23, 2002

(65) Prior Publication Data

US 2003/0139208 A1 Jul. 24, 2003

(51) Int. Cl.⁷ .......................... A01D 17/02; A01F 12/46
(52) U.S. Cl. ...................... 460/114; 198/586; 198/632; 198/666; 198/674; 414/505; 414/519; 414/526; 141/198; 141/231
(58) Field of Search .................................. 460/114, 119; 414/326, 505, 502, 519, 501, 503, 520, 523; 198/583, 584, 314, 586, 632, 666, 674; 141/198, 231

(56) References Cited

U.S. PATENT DOCUMENTS

| | | | | | |
|---|---|---|---|---|---|
| 2,883,076 | A | * | 4/1959 | Palmer | 414/526 |
| 3,174,266 | A | * | 3/1965 | Hoeksema | 56/11.9 |
| 3,286,862 | A | * | 11/1966 | Hansen | 414/502 |
| 3,337,068 | A | * | 8/1967 | Meharry | 414/523 |
| 3,435,941 | A | | 4/1969 | Mayrath | |
| 3,452,885 | A | | 7/1969 | Love | |
| 3,550,793 | A | * | 12/1970 | Davidow | 414/523 |
| 3,584,732 | A | * | 6/1971 | Tyler et al. | 198/632 |
| 3,638,812 | A | | 2/1972 | Ryczek | 214/83.26 |
| 3,638,816 | A | | 2/1972 | Mann | 214/521 |
| 3,719,268 | A | * | 3/1973 | Koehnen | 198/632 |
| 3,721,359 | A | * | 3/1973 | Howell et al. | 414/505 |
| 3,825,138 | A | * | 7/1974 | Pool | 414/505 |
| 3,834,564 | A | | 9/1974 | Laurent et al. | 214/83.26 |
| 4,332,261 | A | | 6/1982 | Webster | 130/27 |
| 4,419,037 | A | * | 12/1983 | Niewold | 414/489 |
| 4,530,429 | A | * | 7/1985 | Erickson | 198/313 |
| 4,583,905 | A | * | 4/1986 | Scherr | 414/505 |
| 4,669,945 | A | * | 6/1987 | Pollard et al. | 414/505 |
| 4,907,402 | A | * | 3/1990 | Pakosh | 56/14.6 |
| 5,100,281 | A | * | 3/1992 | Grieshop | 414/526 |
| 5,468,113 | A | | 11/1995 | Davis | 414/523 |
| 5,516,253 | A | * | 5/1996 | Linscheid et al. | 414/519 |
| 5,733,094 | A | * | 3/1998 | Bergkamp et al. | 414/526 |
| 6,042,326 | A | * | 3/2000 | Thomas et al. | 414/502 |
| 6,113,339 | A | * | 9/2000 | Adams | 414/505 |
| 6,119,847 | A | * | 9/2000 | Mooney et al. | 198/632 |
| 6,125,618 | A | * | 10/2000 | Dillon | 56/14.6 |
| 6,606,844 | B2 | * | 8/2003 | Dillon et al. | 56/14.6 |

FOREIGN PATENT DOCUMENTS

SU 1724126 A1 * 4/1992 ........... A01K/5/00

* cited by examiner

Primary Examiner—Árpád F. Kovács
(74) Attorney, Agent, or Firm—Brant T. Maurer; Rebecca Henkel

(57) ABSTRACT

A hinged unloading auger for an agricultural combine that reduces the portion of the unloading auger that extends beyond the rear end of the combine when the unloading auger is in its storage position. The horizontal section of the unloading auger includes a hinged joint that connects a first segment and a second segment. In the storage position, the joint is separated to provide a compact storage package. In the unloading position, the second segment is rotated around the hinge so that the axes of the first and second segments are coaxial.

28 Claims, 5 Drawing Sheets

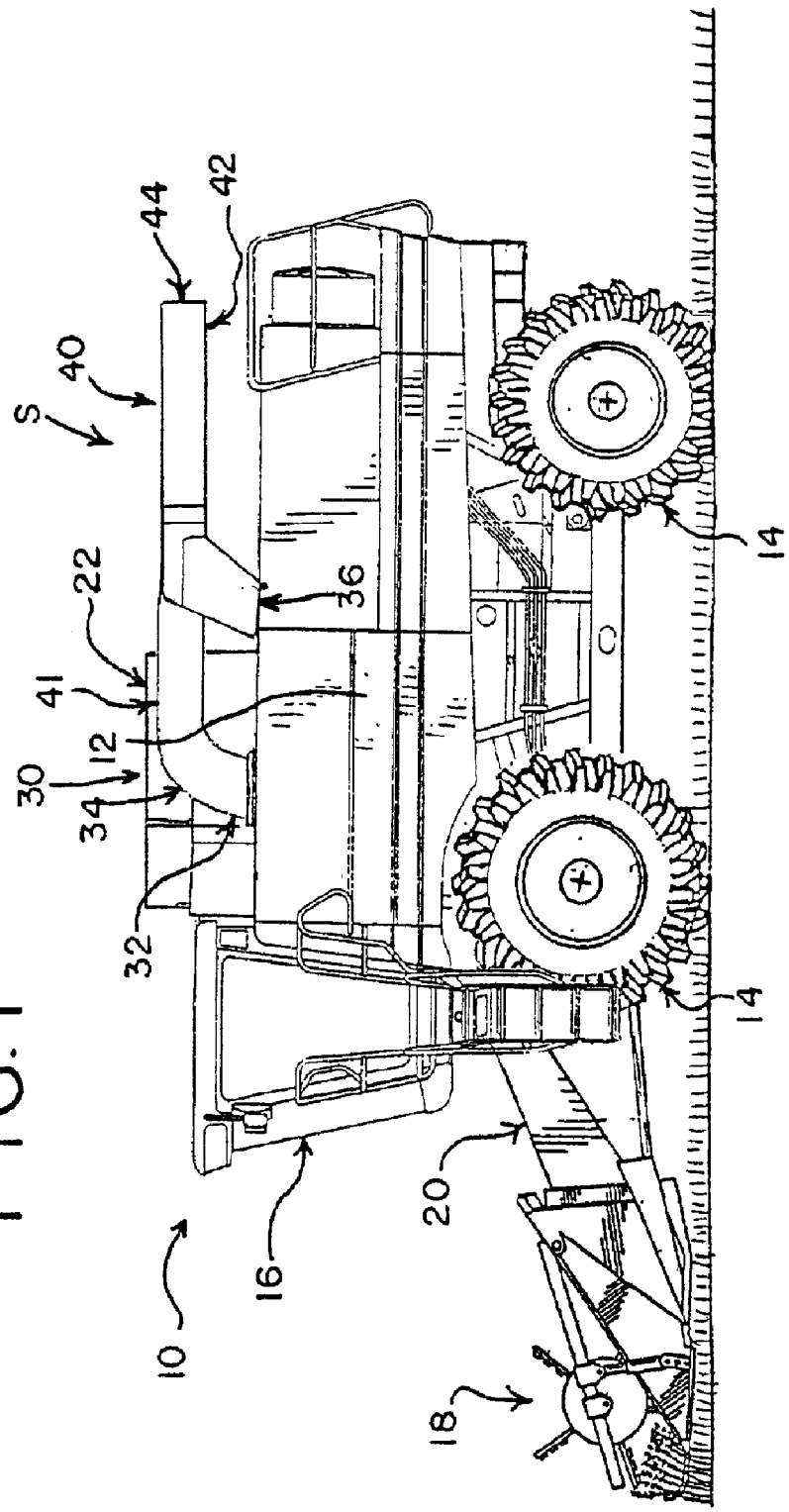

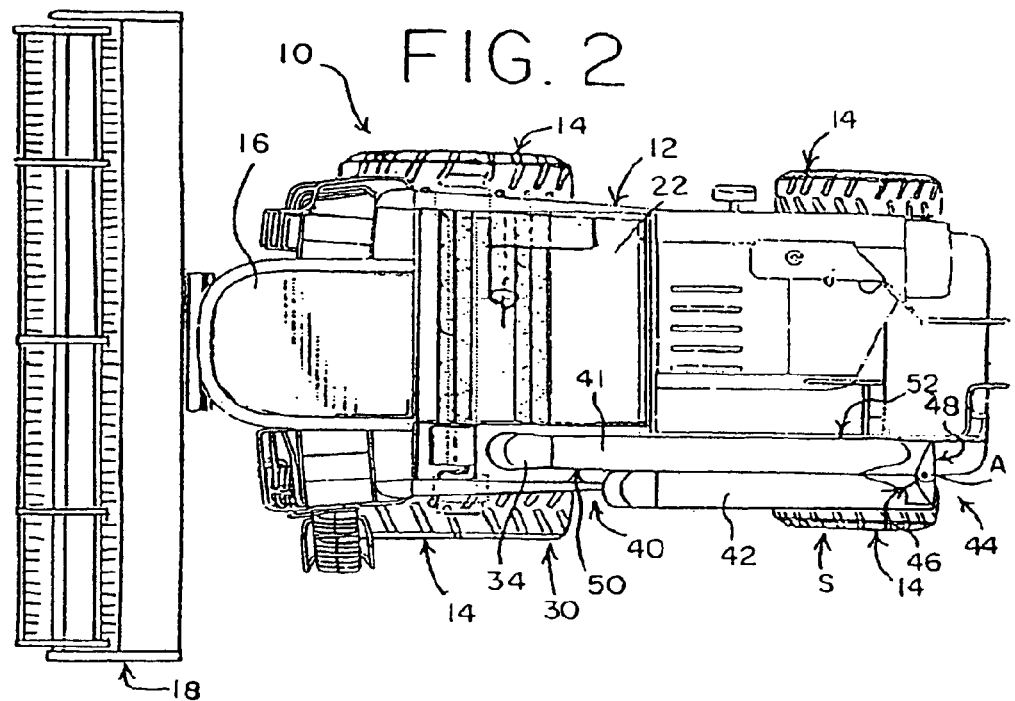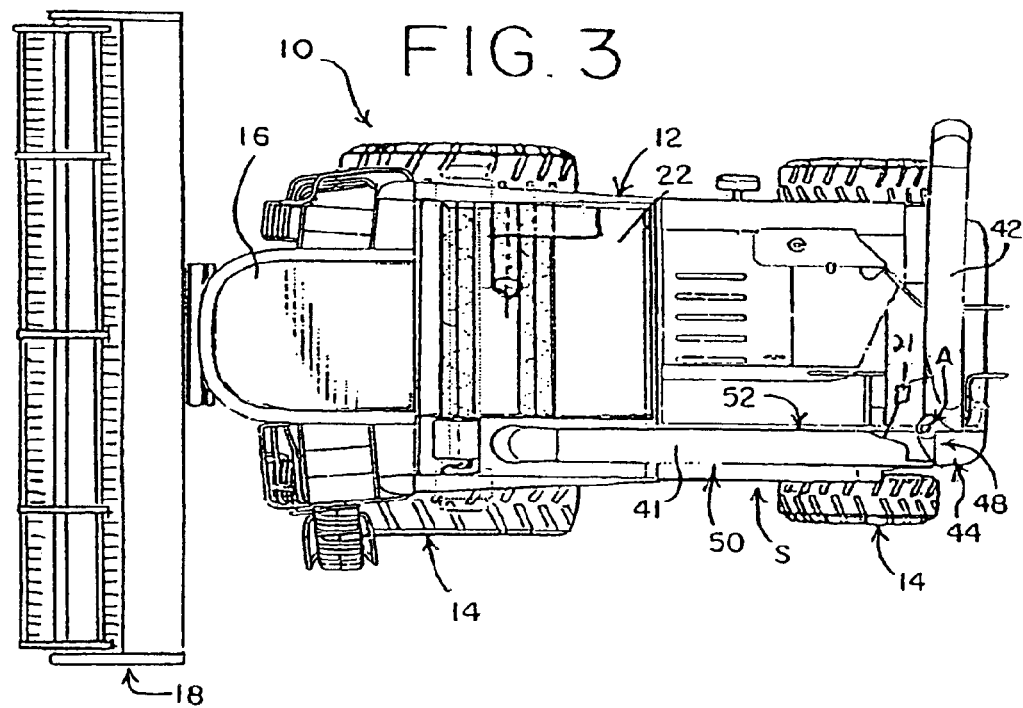

HINGED UNLOADING AUGER FOR AN AGRICULTURAL COMBINE

FIELD OF THE INVENTION

The present invention relates generally to agricultural combines. It relates particularly to a hinged unloading auger.

BACKGROUND OF THE INVENTION

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field and feeds the crop materials to a separating or threshing system. Several different types of threshing systems are available, such as rotary threshers and straw walkers. Regardless of the type of threshing system used, the thresher separates the course non-grain materials from the grain heads. The course non-grain material primarily consists of grain stalks and exits the thresher along its rear end. The grain heads, on the other hand, exit the thresher along the bottom side of the thresher and pass to a series of moving sieves. The sieves separate the grain from the unwanted fine materials, sometimes referred to as chaff. After separation, the grain is directed to a grain bin through an augering system, and the unwanted fine materials exit the sieves along the rear end.

The grain bin serves as a temporary onboard storage location for the grain. Typically, the grain bin is positioned above the threshing system and can have a capacity of as much as 200 bushels for larger combines. As the combine harvests the crop field, the grain bin periodically becomes filled with grain and must be emptied to allow the combine to proceed. The grain is then transferred from the grain bin to a truck or a grain cart through an unloading auger.

The unloading auger is a well-known device to those skilled in the art of combines. Most manufacturers of combines have adopted a similar configuration for the unloading auger. In this common configuration, the unloading auger is positioned along the upper side of the combine with the infeed section of the auger located adjacent to the grain bin. The infeed section is pivotally attached to the combine to allow rotation about a nearly vertical axis. A 90° elbow connects the infeed section to a long horizontal section. The horizontal section can then rotate in a generally horizontal plane around the infeed end. With this design the unloading auger can be rotated out to a 90° angle from the combine to allow unloading into a truck or grain cart. After unloading, the unloading auger is rotated back so that the horizontal section trails towards the rear of the combine with the exit end located near the combine's rear end.

While this configuration for the unloading auger has been a convenient solution for the need to unload the combine's grain bin, the long length of the auger's horizontal section presents a number of problems for both the farmer and the manufacturer. These problems are exacerbated by the increasing production capacity of newer combines which requires ever longer unloading augers.

In order to satisfy farmers' demands for more efficient harvesting equipment, manufacturers have regularly increased the width of the combine header. Currently, some combine headers are as wide as forty feet, and even larger widths are eventually possible. In addition, farmers are increasingly turning to the use of grain carts and unloading the combine's onboard grain bin into the adjacent travelling grain cart while the combine is still harvesting through the field. Frequently, the grain cart is towed by an agricultural tractor which has dual sets of tires installed on it. With this unloading arrangement, the unloading auger must extend over a substantial distance in order to reach the grain cart, including the width of the header, the safety clearance between the header and the tractor tires, and the width of the grain cart and tractor.

Current unloading augers also prevent farmers from implementing a technique known as controlled traffic pattern. In this application the combine unloads grain into an adjacent travelling grain cart like previously described. However to avoid additional soil compaction, the tow tractor and grain cart travel along the combine's prior tire path which is located one swath away from the combine's current travel path. Thus, by reusing the same tire path that has already been created by the combine, more ground soil is left uncompacted, which allows better growing conditions for subsequent crops. Controlled traffic pattern harvesting, however, requires even longer unloading augers than are generally available in order to span the long distance between the combine's current and prior tire paths.

Typically, prior art unloading augers are lengthened by extending the length of the horizontal section and allowing an extended portion to extend beyond the rear end of the combine. This extended portion can raise the manufacturer's shipping costs for the combine significantly however. Shipping costs are often calculated based on the volume of the shipped product. This is especially true when a combine is shipped overseas on a ship. In these cases, if the manufacturer chooses to install the unloading auger at the factory, the extended portion can require as much as 10% more shipping volume than would otherwise be required, substantially increasing the cost of shipping. On the other hand, the manufacturer may choose to ship the unloading auger separately to avoid this cost penalty. However, this alternative suffers from the problems of ensuring that the correct parts are shipped to the customer and that they are properly installed once received.

This extended portion also requires additional storage space on the farm. Farmers typically store their agricultural equipment in large buildings when the equipment is not being used in order to minimize weather related deterioration. Hereto, the extended portion limits the amount of equipment that can be stored in the storage building because other equipment must be positioned behind the end of the unloading auger instead of directly behind the combine's rear end.

Problems also occur when the farmer is operating the combine during harvesting operations. The long horizontal section of the unloading auger makes the overall length of the combine extra long and creates a collision hazard for the extended portion. Farmers operate their combines around a variety of different obstacles, which can be accidentally struck by the extended portion. Examples of these obstacles include trees, telephone poles, buildings, and other vehicles. The risk of rear end collisions is especially great with combines because the large size of the combine and the minimum amount of rearward visibility makes it difficult to see nearby obstacles. When a collision does occur with the unloading auger, the costs to the farmer can be quite high. Not only is the object struck damaged, but the unloading auger will likely be disabled. As a result, the farmer incurs repair costs, and the harvesting operation is delayed until the unloading auger can be fixed.

To minimize the risk of rear end collisions, some countries have implemented transportation regulations that require a combine to be able to turn around within a specified radius without any portion of the combine passing outside the radius. This type of regulation requires that the combine be designed as compact as possible. Satisfying a regulation like this is especially difficult with an unloading auger that extends beyond the rear end of the combine.

BRIEF SUMMARY OF THE INVENTION

Accordingly, it is an object of the invention to provide an unloading auger that minimizes the extended portion of the unloading auger which overhangs the rear end of the combine when the unloading auger is in its storage position.

Another object of the invention is to provide a hinged auger which allows an outer auger segment to rotate away from an inner auger segment.

The unloading auger of the present invention includes a horizontal section with a first segment and a second segment. The first and second segments are connected with a hinged joint that allows the second segment to rotate relative to the first segment. In the storage position, the second segment is rotated away from the first segment in a suitable manner to provide compact storage of the unloading auger. In order to relocate the unloading auger into the unloading position, the second segment is rotated around the hinge so that the axes of the first and second segments are coaxial. The first and second segments are locked in place with a latch. The entire horizontal section, including both the first and second segments, can be rotated outwards through a 90° angle from the combine to allow grain to be unloaded into an adjacent truck or grain cart.

BRIEF DESCRIPTION OF SEVERAL VIEWS OF THE DRAWINGS

The invention, including its construction and method of operation, is illustrated more or less diagrammatically in the drawings, in which:

FIG. 1 is a side elevational view of an agricultural combine, showing the unloading auger in the storage position;

FIG. 2 is a top plan view of an agricultural combine, showing the unloading auger in the storage position;

FIG. 3 is a top plan view of an agricultural combine, showing the unloading auger in an alternative storage position;

DETAILED DESCRIPTION OF THE INVENTION

Figure 4:
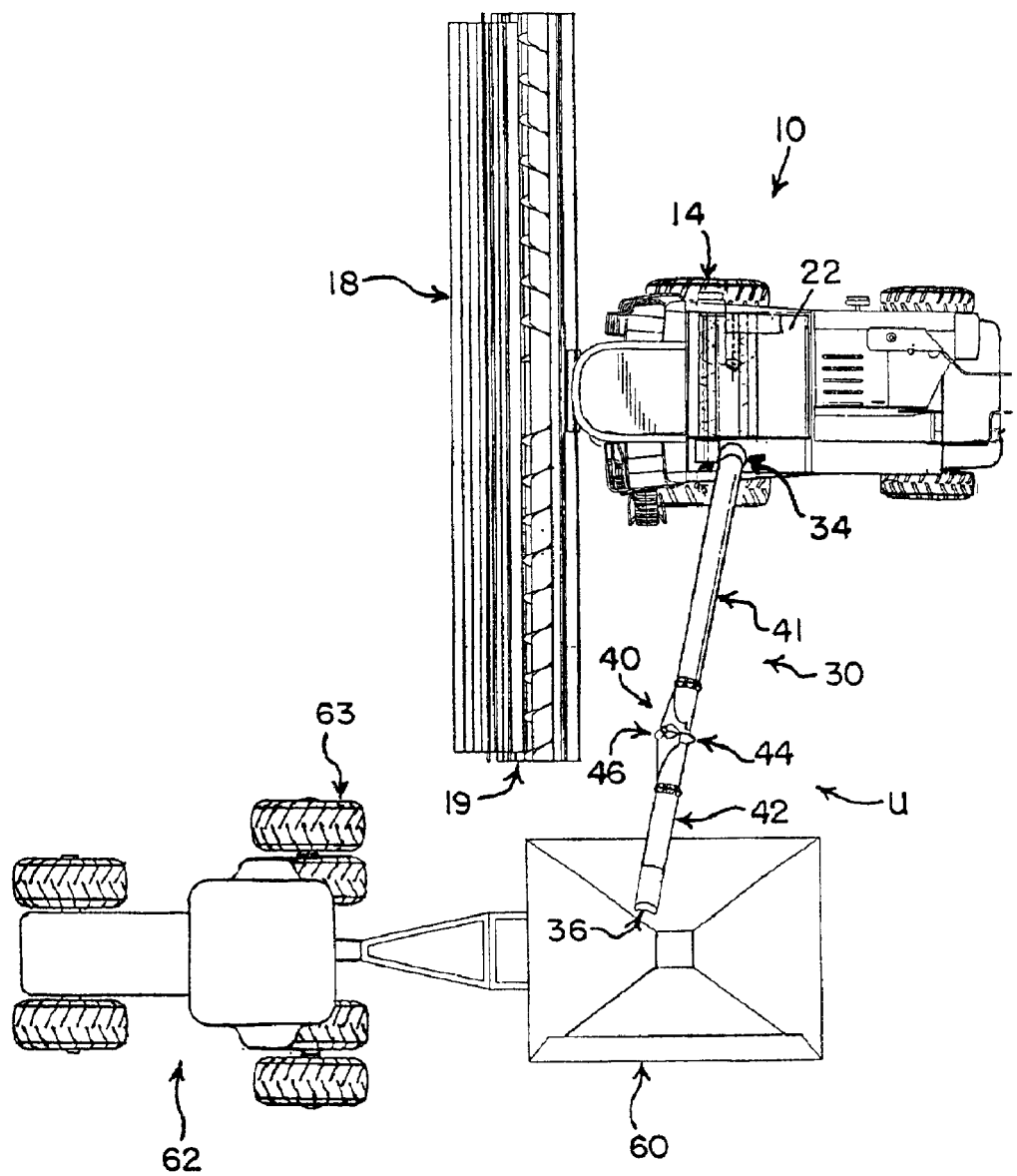
FIG. 4 is a top plan view of an agricultural combine and a grain cart being towed by a tractor, showing the unloading auger in the unloading position.
Figure 5:
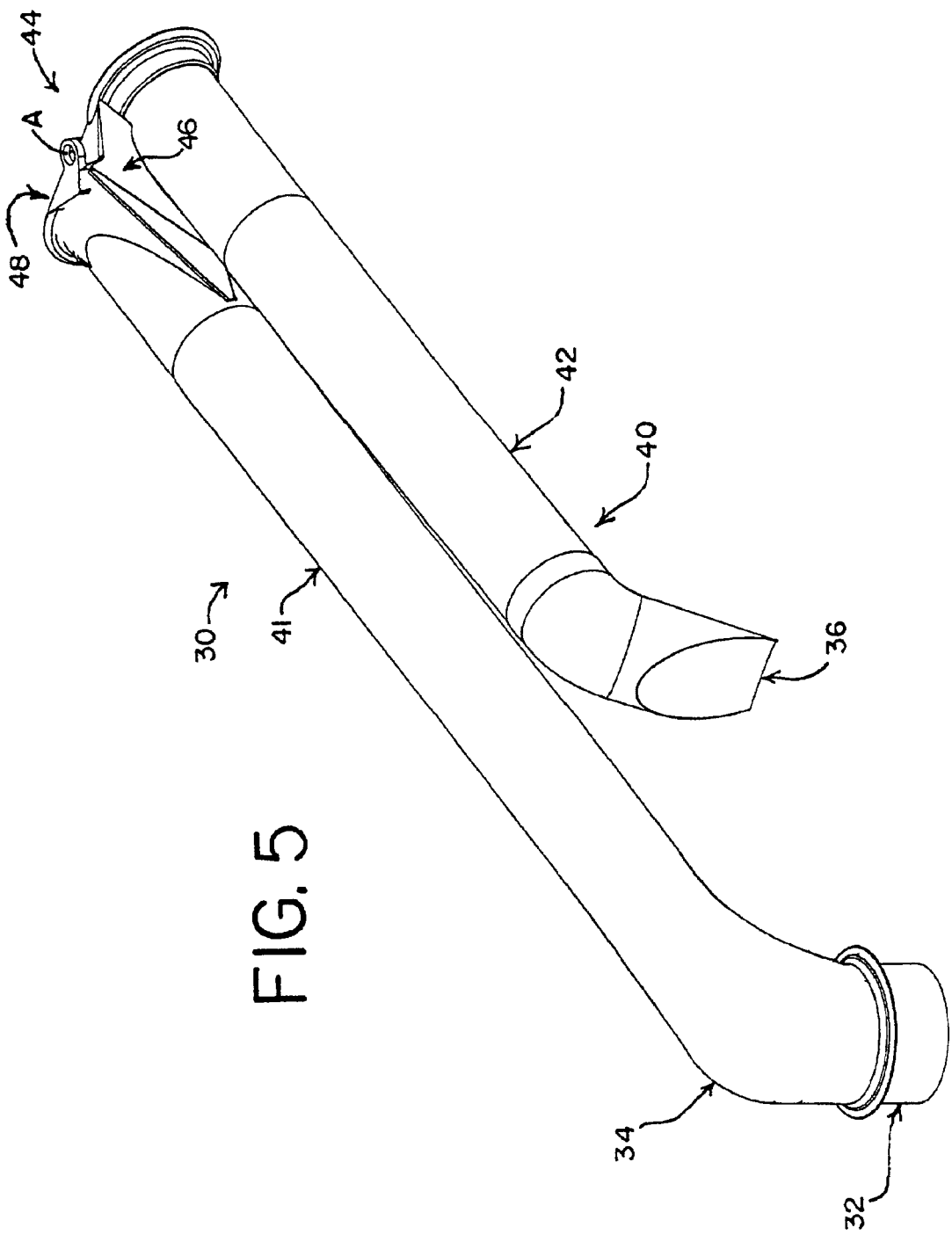
FIG. 5 is a perspective view of the unloading auger, showing the second segment in the storage position.

Referring now to the drawings, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the combine's internal threshing systems (not shown). The threshing systems then separate the grain from the unwanted crop residue. Because the present invention is applicable to a variety of different threshing systems and because threshing systems are generally well-known to those skilled in the art, it is unnecessary to further describe the particular workings of the threshing systems. After the threshing systems have separated the grain from the crop residue, the grain is transferred to an onboard storage bin 22 by an augering system, and the unwanted crop residue is discharged from the rear end of the combine 10 onto the harvested crop field.

When the onboard storage bin 22 becomes full with grain, an unloading auger 30 empties the grain from the storage bin 22 into a truck or a grain cart 60. Most manufacturers use a similar configuration for the unloading auger 30 that is well-known in the art. The unloading auger 30 includes an infeed section 32 that is positioned adjacent to the storage bin 22 and is oriented along a vertical axis that leans rearward about 12°. The input end (not shown) of the infeed section 32 is positioned within the storage bin 22 near its bottom side so that the grain will feed up into the infeed section 32 when the unloader auger 30 is turned on.

The infeed section 32 is pivotally connected to the combine 10 around the infeed section's 32 vertical axis. The infeed section 32 can then be rotated about its vertical axis by a hydraulic cylinder (not shown) that is connected on one end to a lever (not shown) attached to the infeed section 32. At the top end of the infeed section 32, an elbow 34 connects the infeed section 32 to the horizontal outfeed section 40. The horizontal outfeed section 40 is oriented 90° from the infeed section 32 and lies along a horizontal axis. Thus, when the infeed section 32 is pivoted, the horizontal outfeed section 40 rotates around the infeed section 32 in a generally horizontal plane with the outfeed section 40 rising slightly as it is rotated outwards.

The combine operator controls the position of the unloading auger 30 with remote controls provided in the operator's station 16. The unloading auger 30 rotates between an unloading position U and a storage position S. In the unloading position U, the horizontal section 40 is rotated out so that it is generally transverse to the longitudinal axis of the combine body 12. A truck or grain cart 60 is then positioned under the exit opening 36 of the unloading auger 30 in order to receive the grain from the onboard storage bin 22. When the unloading auger 30 is not being used, the horizontal section 40 is rotated back into a storage position S so that it is parallel to the longitudinal axis of the combine body 12.

In the present invention, the horizontal section 40 includes a first segment 41 and a second segment 42 which are separated by a hinged joint 44. Although numerous variations of the invention are possible, the preferred embodiment shown in FIG. 2 includes a hinge 46 on the outer side 50 of the horizontal section 40 that rotates about a vertical axis A. Therefore, when the unloading auger 30 is in its storage position S, the first segment 41 lies along an axis parallel to the longitudinal axis of the combine body 12 with the open end 48 of the first segment 41 facing rearward. The second segment 42 can then be rotated back around the hinge 46 so that it lies parallel to the first segment 41 along the first segment's outer side 50.

The hinge 46 is located in a position between the first segment 41 and the second segment 42 so that a minimum length, if any, of the first 41 and second 42 segments extends beyond the rear end of the combine 10. Preferably, a safety mechanism 31 is included to prevent the unloading auger 30 from running in this position S so that grain will not be inadvertently spilled out onto the ground through the first segment's open end 48. When the second segment 42 has been rotated so that it is coaxial with the first segment 41, a latch 57 (not shown) on the inside 52 of the horizontal section 40 locks the first 41 and second 42 segments together. The flightings (not shown) of the first 41 and second 42 segments are also locked together through the shafts of the flightings with a self-connecting coupler that is well-known to those skilled in the art. After the first 41 and second 42 segments are locked together, the fully assembled horizontal section 40 is rotated from its storage position S to the unloading position U.

In order to move the unloading auger into its unloading position U, the second segment is first rotated rearward about the hinge 46 so that the axes of the first 41 and second 42 segments are coaxial. An actuator 21 is provided along the outside of hinge 46 and is connected to both the first 41 and second 42 segments. The actuator 21 provides the force necessary to rotate the second segment 42 from its storage position S to its coaxial position. In the preferred embodiment, the actuator 21 includes a hydraulic cylinder which can be remotely operated from the operator's station 16. Other variations, however, may include electro-mechanical actuators or may include manually operated mechanical mechanisms.

In the unloading position U, the horizontal section 40 lies along an axis that is generally transverse to the longitudinal axis of the combine body 12. This position allows the unloading auger 30 to reach outwards and away from the combine 10 so that the exit opening 36 can reach a truck or grain cart 60 positioned adjacent to the combine 10. Therefore, in the case of a grain cart 60 for example, the length of the horizontal section 40, including both the first 41 and second 42 segments, must be long enough to span from the unloading auger's infeed section 32 to the center of the grain cart 60. This length of span includes the width of the header 18, the safety gap between the end 19 of the header 18 and the tractor's tires 63, and half of the width of the tractor 62. Once the combine's onboard storage bin 22 has been emptied, the previously explained steps can be reversed to place the unloading auger 30 back in the storage position S.

The unloading auger 30 could also be used to fill a grain cart 60 that is towed behind the combine 10 instead of an adjacent truck or grain cart 60. In this alternative, the second segment 42 would be rotated rearward so that it is coaxial with the first segment 41, as previously described. However, the fully assembled horizontal section 40 would not be rotated out into the previously described unloading position U. Instead, the second segment 42 would be left to extend rearward beyond the rear end of the combine 10 so that the exit opening 36 can access a grain cart 60 being towed behind the combine 10.

Figure 6:
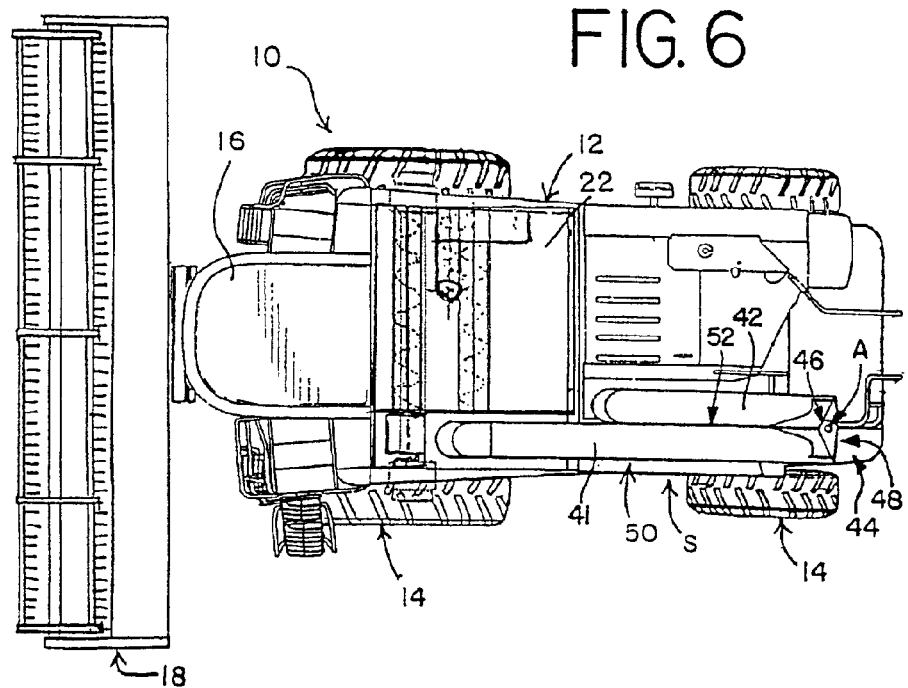
FIG. 6 is a top plan view of an agricultural combine, showing the unloading auger in an alternative storage position.
Figure 7:
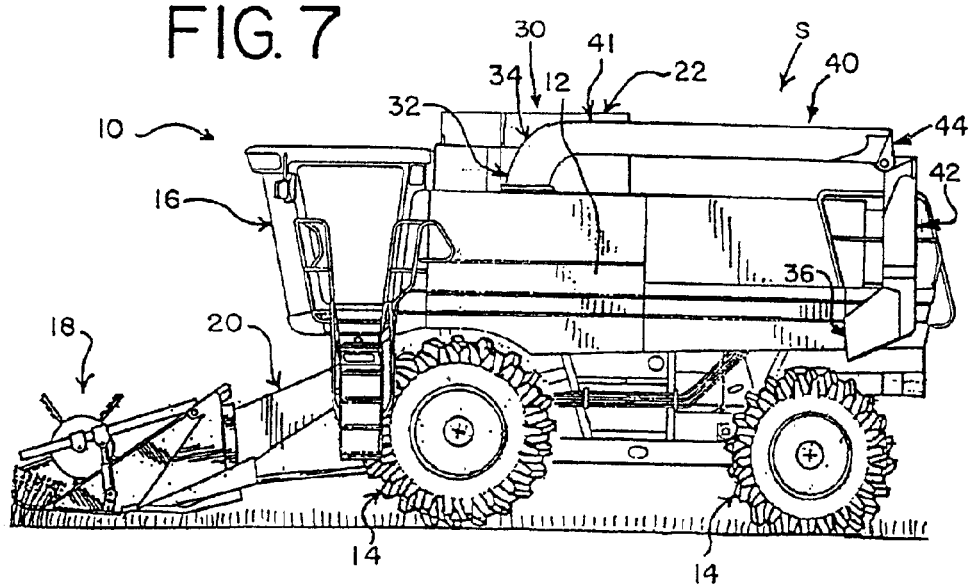
FIG. 7 is a side elevational view of an agricultural combine, showing the unloading auger in an alternative storage position.

A number of alternative embodiments are possible with the present invention. For example, the hinge 46 may be located in a variety of alternative positions. In one alternative, the hinge 46 is positioned on the inside 52 of the horizontal section 40 instead of the outside 50. As shown in FIG. 3, this will allow the second segment 42 to be rotated inward at a 90° angle from the first segment 41 so that it lies along the rear end of the combine 10. As shown in FIG. 6, the second segment 42 could also be rotated 180° inward so that it lies adjacent to the first segment 41 along its inside edge 50. In another alternative hinge position shown in FIG. 7, the hinge 46 is positioned on the bottom of the horizontal section 40 and rotates about a horizontal axis instead of a vertical axis. This would allow the second segment 42 to rotate downwards so that it lies 90° from the first segment 41 in a vertical orientation.

The present invention also allows the hinge 46 to be located in different positions in order to achieve various combinations of lengths for the first 41 and second 42 segments. This attribute of the invention is important because combines 10 vary significantly in size with different applications requiring horizontal sections 40 with different overall lengths.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. In an agricultural combine disposed in an ambient environment, an unloading auger for removing a crop material from a storage bin, said unloading auger comprising:

an infeed section coupled to an outlet of the storage bin for receiving said crop material from said storage bin; and an outfeed section including a first segment coupled to said infeed section and a second segment hingedly connected to said first segment, said first and second segment being pivotal relative to one another at said hinged connection, said pivot being in a substantially horizontal plane, said pivot transitioning said first segment and said second segment between a storage position and a coaxially connected unloading position while maintaining said infeed section in a substantially vertical orientation; and an actuator, said actuator pivoting at least one of said first segment and said second segment in a substantially horizontal plane about said hinged connection.

2. The unloading auger according to claim 1, further comprising a lockable hinge disposed between said first segment and said second segment.

3. The unloading auger according to claim 1, wherein grain is prevented from being accidentally released through an open end of one of said first segment and said second segment when said auger is in said storage position.

4. The unloading auger according to claim 3, wherein, when in said storage position, said first segment and second segment are positioned generally parallel to a longitudinal axis of said combine with the second segment being positioned generally adjacent to the outside edge of said first segment.

5. The unloading auger according to claim 1, wherein said second segment defines an auger exit opening for delivering said crop material to said ambient environment.

6. The unloading auger according to claim 1, wherein said actuator is a hydraulic cylinder.

7. The agricultural combine according to claim 1, wherein, when in said storage position, said first segment and said second segment are positioned generally parallel to a longitudinal axis of said combine with said second segment positioned generally adjacent to an inside edge of said first segment.

8. An agricultural combine having an unloading auger, comprising:
 a) a storage bin; and
 b) an unloading auger movable between a storage position and an unloading position for unloading a crop material from the storage bin, the auger including:
  a horizontal section in communication with the storage bin, said horizontal section including a first segment and a second segment, said first segment being movable with respect to said storage bin, said first segment and said second segment being horizontally disposed when said auger is disposed in said storage position and in said unloading position;
  a hinged joint pivotally connecting said first segment and said second segment, said first segment and said second segment being pivotal relative to one another at said hinged joint, said pivot being in a substantially horizontal plane between said storage position and said unloading position; and
  an actuator for pivoting at least one of said first segment and said second segment in a substantially horizontal plane about said hinge.

9. The agricultural combine according to claim 8, wherein said unloading auger is relocated between said storage position and said unloading position manually.

10. The agricultural combine according to claim 8, wherein:
 a) said combine further includes a body with a rearmost end; and
 b) no portion of said first segment and said second segment extends beyond said rearmost end of said combine when said unloading auger is in said storage position.

11. The agricultural combine according to claim 8, wherein said actuator is a hydraulic cylinder that pivots said first segment and said second segment around said hinged joint, and wherein said hinged joint is lockable and is disposed between said first segment and said second segment.

12. The agricultural combine according to claim 8, wherein, when in said storage position, said first segment and said second segment are positioned generally parallel to a longitudinal axis of said combine with the second segment positioned generally adjacent to an inside edge of said first segment when said auger is in the storage position.

13. The agricultural combine as recited in claim 8, wherein said storage bin defines an upper surface, and wherein said horizontal section is in communication with said upper surface.

14. The agricultural combine according to claim 8, wherein, when in said storage position, said first segment is positioned generally parallel to a longitudinal axis of said combine and said second segment is positioned generally transverse to said longitudinal axis of said combine, said second segment being positioned generally along the rear end of said combine.

15. The agricultural combine according to claim 8, wherein said actuator is a hydraulic cylinder.

16. The unlading auger according to claim 8, wherein, when in said storage position, said first segment and said second segment are positioned generally parallel to a longitudinal axis of said combine with said second segment being positioned generally adjacent to an outside edge of said first segment.

17. The agricultural combine according to claim 8, wherein, when in said storage position, said first segment is positioned generally parallel to a longitudinal axis of said combine and said second segment is positioned generally transverse to said longitudinal axis of said combine, said second segment being positioned generally along the rear end of said combine.

18. In an agricultural combine disposed in an ambient environment, an unloading auger for removing a crop material from a storage bin, said unloading auger comprising:
 an infeed section coupled to an outlet of said storage bin for receiving said crop material from said storage bin; and
 a two-segmented, foldable outfeed section including a first segment and a second segment, said first segment including a first end and a second end, said first end coupled to said infeed section and said second end pivotally coupled to said second segment, said pivotal coupling defining a single axis of pivotal movement, said second segment being pivotally foldable relative to said first segment, said pivotal fold allowing transition of said outfeed section between a storage position and a coaxially connected unloading position, said transition occurring about only one axis of pivot;
 wherein, when in said storage position, said first segment is positioned generally parallel to a longitudinal axis of said combine and said second segment is positioned generally transverse to said longitudinal axis of said combine with said second segment positioned generally along the rear end of said combine.

19. The unloading auger according to claim 18, wherein said actuator is a hydraulic cylinder.

20. The unloading auger according to claim 18, wherein said first segment and said second segment pivotally fold relative to one another in a substantially horizontal plane between said storage position and said unloading position.

21. The unloading auger according to claim 18, wherein said first segment and said second segment pivotally fold relative to one another in a substantially vertical plane between said storage position and said unloading position.

22. A method of moving an auger of an agricultural combine between an unloading position and a storage position, the method comprising the steps of:
 pivoting a substantially horizontally disposed outfeed auger in a substantially horizontal plane relative to a grain storage bin of said combine, said outfeed auger including at least a first segment and a second segment, said first segment being pivotally connected to said second segment; and
 pivotally folding at least one of said first segment and said second segment in a substantially horizontal plane relative to said other such that said first and second segments are in a side-by-side relationship when said auger is in said storage position.

23. The method of claim 22, wherein the step of pivotally folding includes positioning said first segment and said second segment into substantially horizontally planar coaxial alignment when in said unloading position and positioning said first segment and said second segment parallel to a longitudinal axis of said combine, said second segment being positioned generally adjacent to an outside edge of said first segment, when in said storage position.

24. The method of claim 22, wherein the step of pivotally folding includes positioning said first segment and said second segment into substantially horizontally planar coaxial alignment when in said unloading position and positioning said first segment and said second segment parallel to a longitudinal axis of the combine, said second segment being positioned generally adjacent to an inside edge of said first segment, when in said storage position.

25. The method of claim 22, wherein the step of pivotally folding includes positioning said first segment and said second segment into substantially horizontally planar coaxial alignment when in said unloading position and positioning said first segment parallel to a longitudinal axis of said combine and said second segment generally transverse to said longitudinal axis of said combine, said second segment being positioned generally along the rear end of the combine, when in said storage position.

26. A method of moving an auger of an agricultural combine between an unloading position and a storage position, wherein the combine includes a storage bin housing crop material, the method comprising the steps of:

pivoting a substantially horizontally disposed outfeed auger in a substantially horizontal plane relative to a grain storage bin of said combine, said outfeed auger including at least a first segment and a second segment, said first segment being pivotally connected to said second segment;

coupling an infeed segment to the first segment and to an outlet of the storage bin for receiving said crop material from said storage bin; and pivotally folding said second segment in a substantially vertical plane relative to said first segment while maintaining the infeed segment in a substantially vertical orientation.

27. The agricultural combine according to claim 26, wherein the step of pivotally folding includes positioning said first segment and said second segment into substantially horizontal planar coaxial alignment when in said unloading position and positioning said first segment parallel to a longitudinal axis of said combine and said second segment generally vertical to the ground, when in said storage position.

28. In an agricultural combine disposed in an ambient environment, an unloading auger for removing a crop material from a storage bin, said unloading auger comprising:

an infeed section coupled to an outlet of said storage bin for receiving said crop material from said storage bin; and a two-segmented, foldable outfeed section including a first segment and a second segment, said first segment including a first end and a second end, said first end coupled to said infeed section and said second end pivotally coupled to said second segment, said pivotal coupling defining a single axis of pivotal movement, said second segment being pivotally foldable relative to said first segment, said pivotal fold allowing transition of said outfeed section between a storage position and a coaxially connected unloading position, said transition occurring about only one axis of pivot wherein, when in said storage position, said first segment is generally parallel to a longitudinal axis of said combine and said second segment is positioned generally vertically to the ground.

* * * * *